Figure 1:
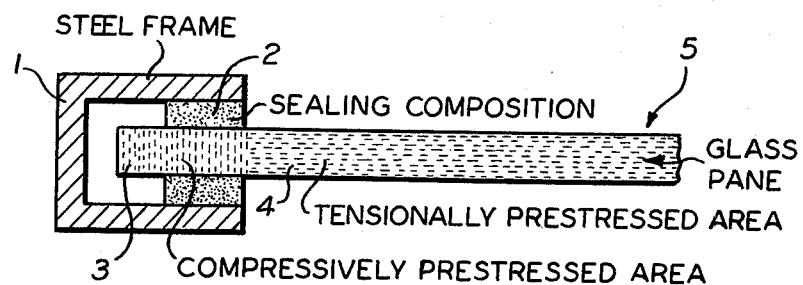

United States Patent [19]
Kiefer

[11] 3,984,252
[45] Oct. 5, 1976

[54] FIREPROOF GLASS WINDOWPANES

[75] Inventor: Werner Kiefer, Mainz-Mombach, Germany

[73] Assignee: Jenaer Glaswerk Schott & Gen., Mainz, Germany

[22] Filed: Sept. 13, 1974

[21] Appl. No.: 505,895

[30] Foreign Application Priority Data
Mar. 21, 1974 Germany............................ 2413552

[52] U.S. Cl................................. 106/54; 65/65 R
[51] Int. Cl.²...................... C03C 3/04; C03C 3/08; C03B 29/00
[58] Field of Search........................ 161/41, 43–44, 161/403; 156/99, 107, 109; 65/65 R, 114–115; 106/54; 428/44, 45, 921

[56] References Cited
UNITED STATES PATENTS

| | | | |
|---|---|---|---|
| 2,068,801 | 1/1937 | Hood | 106/54 |
| 3,008,841 | 11/1961 | Tiede | 106/54 |
| 3,243,335 | 3/1966 | Faile | 65/114 X |
| 3,298,553 | 1/1967 | Lusher | 65/115 X |
| 3,326,703 | 6/1967 | Harrington | 106/54 |
| 3,420,685 | 1/1969 | Martin | 106/54 |
| 3,673,049 | 6/1972 | Giffen et al. | 65/114 X |
| 3,784,386 | 1/1974 | Araujo | 106/54 |
| 3,784,387 | 1/1974 | Sack | 106/54 |
| 3,806,400 | 4/1974 | Laethem | 161/44 |

Primary Examiner—Winston A. Douglas
Assistant Examiner—John F. Niebling
Attorney, Agent, or Firm—Burgess, Dinklage & Sprung

[57] ABSTRACT

Fireproof glass, or glass ceramic in a form suitable for use as windowpanes, which will withstand heating in accordance with DIN (German Industrial Norm) 4102 (1970 edition), standard temperature curve I, and having a compressive prestress in the peripheral portion thereof. The glass, or glass ceramic is such that the product of the thermal expansion coefficient, $\alpha$, and the modulus of elasticity, E, is 1 to 5 kp $\times$ cm$^{-2}$ $\times$ °C$^{-1}$.

21 Claims, 3 Drawing Figures

FIRE CURVE OF DIN 4102 (1970 ED.)

FIRE CURVE OF DIN 4102 (1970 ED.)

FIREPROOF GLASS WINDOWPANES

BACKGROUND

The invention relates to fireproof glass or ceramic glass windowpanes which have such a high thermal resistance that, when used as glazing in doors and windows, they can withstand the fire test of DIN Standard 4102 (1970) without disintegrating due to heat.

It is generally known that, in the event of an outbreak of fire in a building, the glazing in windows, doors and partitions is broken by the heat and the fragments fall out of the frames. This disintegration and fallout of glass in the event of a fire is dangerous for two reasons. On the one hand, the falling pieces can cause serious injury, and on the other hand the fire can pass through the openings thus formed in the interior of the building and spread from room to room, and also spread through exterior windows to the floors above. What catastrophes this can produce has been shown by many fires in high buildings.

The only glasses which have hitherto been used in architectural glazing which are fire resistant in accordance with DIN Standard 4102 are wire reinforced glass and glass bricks. For many applications, however, wire glass and glass bricks are unsuitable. For optical reasons, wire glass cannot be used, for example, as window glass in residential construction. Glass bricks, on account of their great weight and greatly reduced transparency, can be used only for special purposes.

In comparison with commercial structural glass, crystal plate glass or float glass, which are all very similar with respect to their thermal expansion, thermally hardened structural glass not only possesses greater mechanical strength but also greater thermal strength. Consequently, these thermally hardened glasses are used also in exterior walls in which temperature differences of up to 100° to 120° C can occur.

In a fire test in accordance with DIN 4102 sheet No. 2 (1970 Edition), page 3, Section 5.2.4. (FIG. 3 hereof, Curve I), plain windows and thermally hardened windows of structural glass, crystal plate glass or float glass will disintegrate within no more than 2 to 3 minutes, thus failing to fulfill requirements with regard to the prevention of the passage of fire and smoke. Wire glass and glass bricks disintegrate in 2 to 3 minutes also, but either due to the wire reinforcement or to the width of the bricks, their integrity is preserved and the passage of fire and smoke is prevented for at least 60 minutes. The wire mesh in wire glass has furthermore always proven disadvantageous wherever it is important to be able to use the glazed opening as an escape route or for the exhausting of smoke.

THE INVENTION

Figure 3:
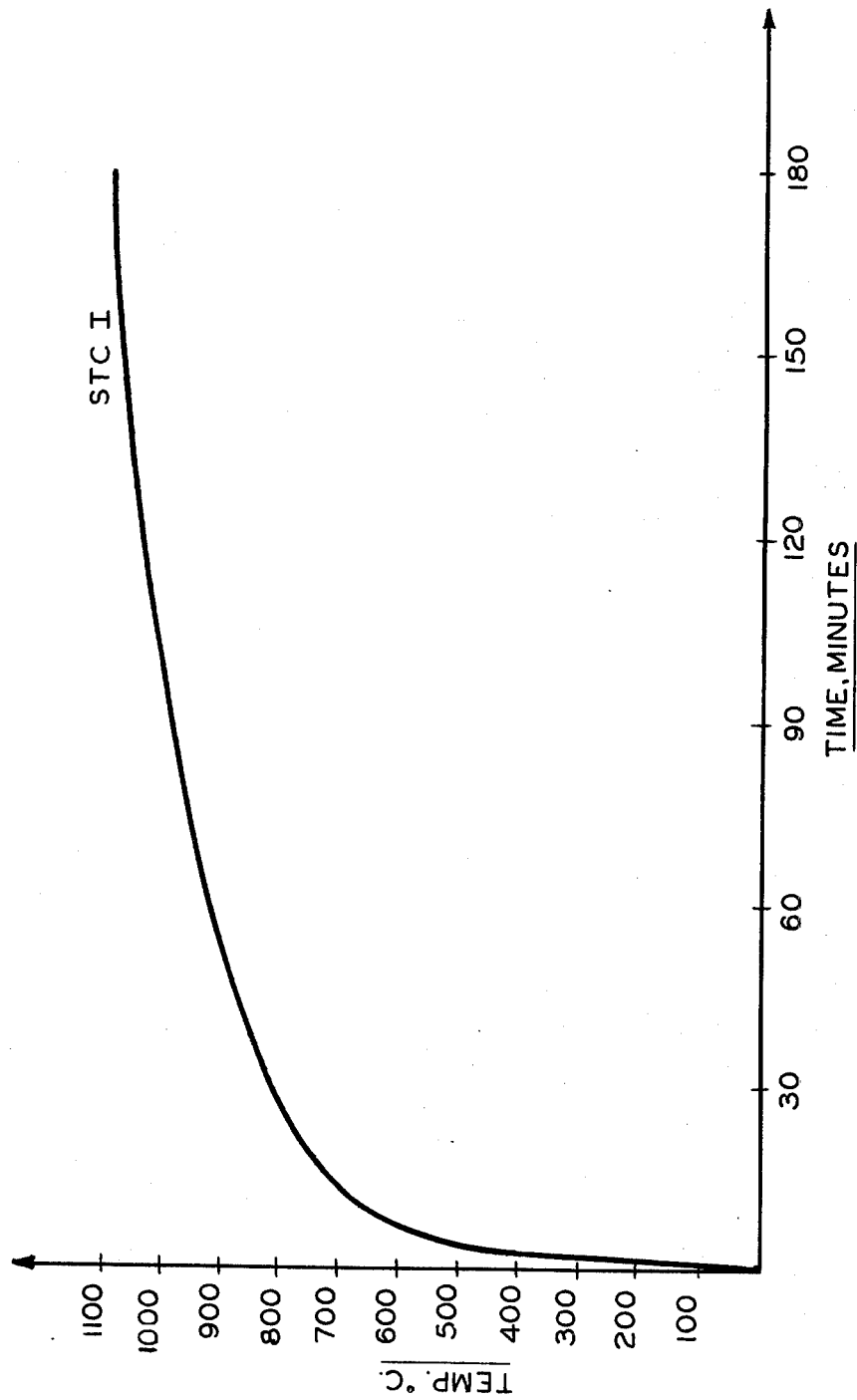

The object of the present invention is to devise windowpanes having such great thermal resistance that, when mounted in doors and windows, they will withstand a fire test in accordance with DIN 4102 (1970 Edition), sheet 2, Section 5.2.4. FIG. 3, STC I, the coordinates time and temperature for which are, respectively, 0 and 0; 5, 556; 10 and 659; 15 and 718; 30 and 821; 60 and 925; 90 and 986; 120 and 1029; 180 and 1090, for at least 30 minutes without disintegrating due to heat and will furthermore not require wire reinforcement. In contrast to glass bricks, the thicknesses of the windowpanes will differ only slightly or not at all from those commonly used in architectural glazing.

It has been found that this object can be achieved with windowpanes which are characterized by a compressive prestress in the marginal area and which consist of glasses or glass ceramics in which the product of the thermal expansion ($\alpha$) and the modulus of elasticity (E) amounts to from 1 to 5 kp . cm$^{-2}$ . ° C$^{-1}$.

For the fire test of DIN 4102, the glass, mounted in a window or door frame, must be installed in a wall in a test kiln. Upon the rapid rise of the temperature in accordance with the Standard Temperature Curve (STK) of sheet 2, Section 5.2.4. (FIG. 3, Curve I), a temperature gradient is produced between the center of the glass and the edge thereof, because the edge of the glass is initially heated up more slowly than its center due to the thermal insulating effect of the frame. Due to this temperature gradient a tensional stress is produced in the marginal area which can result in the destruction of the glazing. The amount of the temperature gradient depends on the rate of the temperature rise, the thermal insulation of the edge of the pane by the frame, and the thickness of the frame. In a 2 to 3 cm thick frame the temperature difference is generally between 200° and 300° C. In a thicker frame the temperature difference may be even higher. But since the tensions diminish again above the transformation temperature (Tg), the temperature difference which results in tensional stresses cannot become greater than ~ Tg, which for borosilicate glasses is approximately 550° C.

Since a frame approximately 2 cm thick is generally required for the mounting of the glass, the glass or glass ceramics must have a thermal strength great enough to withstand a temperature gradient between the hotter center of the glass and the cooler edge of approximately ≧ 200° ≦ 550° C without disintegrating.

Normal window glass or window glass ceramic in which the product of $\alpha$ . E is greater than 1 kp . cm$^{-2}$ . ° C$^{-1}$ generally does not have sufficient thermal resistance to withstand a fire test without disintegrating.

The fireproof glass or glass ceramic windowpanes of the invention are those in which the product of the thermal expansion ($\alpha$) times the elasticity modulus (E) is = 1 to = 5 kp . cm$^{-2}$ . ° C$^{-1}$ and which additionally have a compressive prestress in the marginal area only or in both the marginal area and the surface layers in the middle of the sheet. These especially hardened windowpanes have sufficient thermal resistance to withstand a temperature difference of at least 200° C without disintegrating.

The higher the compressive prestress is in the margins of such glass or glass ceramic windowpanes, the greater is their resistance to temporary stresses which develop between the middle of the pane and the margin gripped by the frame, in the event of a rapid temperature rise.

It has been found that the amount of compressive prestress that can be present in the margin of the windowpane is limited by the tensional stress that develops as reactive stress in the middle of the pane.

Glasses in general are reckoned to have a strength of 200 to 300 kp/cm². If these glass panes provided with compressive prestress in the marginal area and tensional stress in the middle area are to withstand a load such as wind pressure, for example, the strength in the middle area must not be too greatly reduced.

The maximum tensional prestress which can be permitted in practical use in the surface of the pane should therefore generally not exceed about 80 to 100 kp/cm², since otherwise mechanical strength would be too greatly reduced. Due to the compressive prestress present in the marginal area of the glass or glass ceramic windowpanes, therefore, the mechanical strength of the panes can not be reduced by any more than about 80 to 100 kp/cm². Those glass or glass ceramic windowpanes which have a compressive prestress also in the surface of the middle area will generally also have an improved mechanical strength.

Windowpanes made of glass ceramics in which the product of the thermal expansion ($\alpha$) multiplied by the modulus of elasticity (E) is equal to or less than $1$ kp . cm$^{-2}$ . ° C$^{-1}$ are fireproof glass ceramic windowpanes without having a compressive prestress in the peripheral areas. Windowpanes made of these glass ceramics have such a high thermal resistance that they are able to withstand even a temperature difference of $\geq 200°$ C $\leq 550°$ C such as can develop in the case of a temperature rise following the Standard Temperature Curve (STC-I), without disintegrating. Since glass ceramics, which consist partially of a glass phase and partially of a crystal phase, are not generally further transformed or greatly deformed until temperatures between 900° and 1200° C are reached, windowpanes made therefrom are able to withstand an STC-I temperature rise in some cases for 90 minutes and longer.

The fireproof glass windowpanes hereof, in which the product of $\alpha . E \geq 1 \leq 5$ kp . cm$^{-2}$ . ° C$^{-1}$, can be, for example of borosilicate glasses having thermal expansions $\alpha$ (20° – 300° C) between $30 . 10^{-7}$ and $65 . 10^{-7}$ ° C$^{-1}$ or of alumo- boro -silicate glasses having thermal expansions $\alpha$ (20° – 300° C) between $20 . 10^{-7}$ and $62 . 10^{-7}$ [°C$^{-1}$].

However, glass or glass ceramic windowpanes consisting of other glasses or glass ceramics whose product $\alpha . E \geq 1 \leq 5$ kp . cm$^{-2}$ . ° C$^{-1}$ can also be used if they are provided with a corresponding compressive prestress in their marginal area.

Some of the alumo-(boro)-silicate glasses have a very high softening temperature of over 900° C. This has the advantage that windowpanes made of these glasses will seal off a space, such as a furnace room for example for a longer period. Depending on the thickness and size of the windowpanes made of these glasses with a softening temperature of more than 900° C can withstand a fire for 90 minutes before the glass reaches its softening temperature and sags to allow the passage of fire and smoke.

Windowpanes of the claimed glasses have not been used hitherto for architectural glazing. The manufacture of windowpanes of the claimed glasses is more difficult and more expensive from the viewpoint of raw material. Since these glass panes have hitherto offered no important advantages over structural glass, crystal plate glass or float glass in architectural glazing, there has been no reason for using these glasses.

The fireproof glass or glass ceramic windowpanes of the invention can also have rounded corners or be completely round. This increases, rather than decreases, their thermal resistance. Moreover, the invention also includes glass or glass ceramic windowpanes which are slightly domed or formed into hemispheres, such as those used for skylights, for example.

The fireproof glass or glass ceramic windowpanes of the invention can be used both in architectural glazing in the broadest sense and in all applications where there is danger of fire. One of the most important fields for the use of fireproof windowpanes is no doubt that of exterior window glazing in high-rise structures, but especially in hospitals, schools and homes for the aged. Fireproof windowpanes can be used in such applications both for single glazing and in insulating or double glazing, in conjunction with float glass or plate glass.

In the future, the spread of fire from floor to floor through the exterior wall can be prevented by the installation of the new fireproof windowpanes.

The fireproof glass or glass ceramic windowpanes can also be used as construction elements between window areas, both inside and outside.

One advantage of the fireproof windowpanes lies in the fact that they do not disintegrate causing fragments to fall and injure firemen or other persons during a fire.

In interior finishing, the new fireproof glass or glass ceramic windowpanes can be installed in fire resistant, fire retardant and flameproof partition walls and load bearing interior walls. Here, again, the fireproof panes can be used either for single glazing or for multiple glazing, only one of the panes generally needing to be a fireproof pane, for the prevention of the passage of fire or smoke. In addition, the fireproof glass or glass ceramic windowpanes can be used in conjunction with thermal insulation layers.

Another application for fireproof glass or glass ceramic windowpanes is for fire doors and windows.

The requirements which have to be met by glazing in doors and windows of elevator shafts are substantially less stringent with regard to thermal resistance than in the case of fire-retardant partitions, for example. Consequently the claimed fireproof glass or glass ceramic windowpanes can also comply with these requirements.

The use of the fireproof glass or glass ceramic windowpanes, however, is not limited to direct architectural glazing. They can be used wherever two rooms have to be separated from one another where there is danger of fire in one of the rooms. For example, exhaustion duct glazing can also consist of fireproof glass or glass ceramics.

Thus, the invention provides a fireproof glass in a form suitable for use as a windowpane, which will withstand heating in accordance with DIN 4102, 1970 Edition, standard temperature Curve I, for at least 30, preferably 60 minutes, having a compressive prestress in the peripheral portion thereof. The product of the thermal expansion coefficient, $\alpha$, and the modulus of elasticity, E, of the glass, is 1 to 5 kp $\times$ cm$^{-2}$ $\times$ ° C$^{-1}$.

As ramifications of the invention, the following can be noted.

The glass can be transparent, and free of wire reinforcement, and is suitable for architectural glazing, and for exterior glazing.

Desirably, the glass is in a form free of sharp corners. It can have straight sides joined by rounded corners, can be round or circular. Thus, the sheet can be free of corners formed by intersecting straight sides. It can be dome shaped.

The glass can have additional compressive prestress in the surface layer of the glass within the peripheral portion.

Desirably, the glass withstands a temperature gradient between the center thereof and the periphery thereof, of at least 200° C, upon heating of the glass in accordance with standard temperature Curve I for at least 30 minutes, preferably for 60 minutes.

In a prefered embodiment, the glass is a borosilicate glass having a thermal expansion coefficient, $\alpha$, for 20°–300° C, in a range of $30 \times 10^{-7}$ to $65 \times 10^{-7}$ per °C.

By "borosilicate glass" is meant a glass composition containing at least 6% by weight $B_2O_3$ and 64% by weight $SiO_2$. The following such compositions are well suited for the purposes of the invention.

| | | | |
|---|---|---|---|
| $SiO_2$ | 64 | – 81 | weight % |
| $B_2O_3$ | 6 | – 17 | '' |
| $Al_2O_3$ | 1.5 | – 7 | '' |
| $P_2O_5$ | 0 | – 3 | '' |
| $Li_2O$ | 0 | – 0.5 | '' |
| $Na_2O$ | 3 | – 10 | '' |
| $K_2O$ | 0 | – 6 | '' |
| CaO | 0 | – 5 | '' |
| ZnO | 0 | – 5 | '' |
| MgO | 0 | – 1 | '' |
| BaO | 0 | – 8 | '' |

In another prefered embodiment, the glass is alumboro-silicate glass having a thermal expansion coefficient, $\alpha$, for 200°–300° C, in the range of $20 \times 10^{-7}$ to $63 \times 10^{-7}$ per ° C. By "alumo-boro-silicate glass" is meant a glass composition containing at least 9% by weight $Al_2O_3$, 1% by weight $B_2O_2$ and 52% by weight $SiO_2$. The following such compositions are well suited for the purposes of the invention.

| | | | |
|---|---|---|---|
| $SiO_2$ | 52 | – 70 | weight % |
| $B_2O_3$ | 1 | – 14 | '' |
| $P_2O_5$ | 0 | – 8 | '' |
| $Al_2O_3$ | 9 | – 22 | '' |
| $Na_2O$ | 0 | – 9 | '' |
| CaO | 0 | – 8 | '' |
| MgO | 0 | – 8 | '' |
| BaO | 0 | – 5 | '' |
| ZnO | 0 | – 7 | '' |
| CuO | 0 | – 4.5 | '' |
| MnO | 0 | – 3 | '' |

As indicated, the material can be a glass ceramic instead of a glass. For glass ceramics, the glass withstands heating in accordance with DIN 4102, 1970 Edition, standard temperature Curve I, for at least 30 minutes, and, like the glass, has a compressive prestress in the peripheral portion thereof. The product of the thermal expansion coefficient, $\alpha$, and the modulus of elasticity, E, of the glass ceramic, being for 1 to 5 kp $\times$ cm$^{-2}$ $\times$ ° C$^{-1}$. The ramifications mentioned above with respect to the glass, apply also to the glass ceramic.

The testing in accordance with DIN 4102 (1970 Edition) is performed as follows:

The windowpane to be tested is installed in a steel frame and the assembly is set into 12 mm thick brick wall measuring 2 m $\times$ 2.5 m and serving as a chamber wall in a test kiln. The temperature of the oil fired test kiln is raised according to the Standard Temperature Curve (STC) (FIG. 3, Curve I). Within the first 5 minutes of heating up the temperature is not allowed to deviate more than ±100° C from the STC. Furthermore after the first 5 minutes the area under the measured test curve is not allowed to diviate more than ±10% from the area under the STC.

The compressive prestress in the peripheral portion of the glass or glass ceramic is 200 to 900, preferably 300 to 500 kp/cm². Compressive stress is determined by well known optical stress determining methods. The peripheral prestress portion extends from the periphery inwardly from 0.5 to 10 cm, preferably 1 to 3 cm.

The tensile prestress within the peripheral area which is caused by the compressive prestress in the peripheral area should not exceed, 80 to 100 kp per cm².

The compressive prestress in the surface layer of the glass, within the peripheral portion which is compressively prestressed can be 0 to 600, kp per cm².

In the drawings:

FIG. 3 is a plot of temperature against time in minutes for the heating according to procedures of the said DIN 4102, including the Standard Temperature Curves I, (STC), of said standard.

Figure 2:
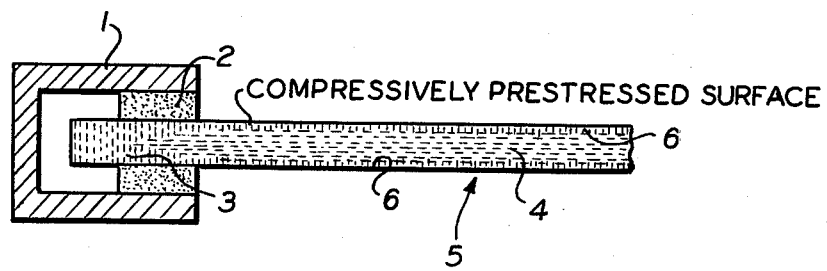

FIG. 2, and FIG. 1 depict windowpanes according to the invention, mounted in frames.

Referring to FIG. 1, glass pane 5 is mounted in steel frame 1 by sealing composition 2. The peripheral portion 3 of the glass pane 5, which is gripped by the frame 1 is compressively prestressed, while the portion of the pane inwardly of said prestressed area is tentionally prestressed. In FIG. 2, the construction is the same, except that the surface portion of the pane inwardly of the prestressed peripheral portion is compressively prestressed.

EXAMPLES

The following examples will serve to explain the invention.

EXAMPLE 1

A glass windowpane measuring 1000 mm $\times$ 1000 mm $\times$ 7 mm, made of a glass having the composition (batch basis, in % by weight): $SiO_2$ 80.50; $B_2O_3$ 12.80; $Al_2O_3$ 2.40; $Na_2O$ 3.60 and $K_2O$ 0.70, and the physical properties: $\alpha$ (20° – 300° C): 32.3 . $10^{-7}$ per ° C and E = 6.3 . $10^5$ [kp/cm²], is placed between two ceramic plates measuring 1000 $\times$ 1000 $\times$ 50 mm.

The entire sandwich is heated in a furnace chamber to 630° C and held at this temperature for about 1 hour. Then the two ceramic plates with the glass pane between them are removed from the furnace and cooled in air. The exposed edge cools rapidly in air, while the middle of the pane is kept still at 630° C, initially, by the ceramic shield, and then it slowly drops to the transformation temperature in the course of 30 to 60 minutes. The rate at which the temperature in the middle of the glass sheet decreases depends very greatly on the thickness and on the material of the ceramic plates. After the middle of the pane has cooled off, an area of compressive prestress about 7 cm wide has formed in the marginal area of the pane. The compressive prestress increases from the inside to the edge of the pane. The compressive stress at the immediate edge of the pane amounts to approximately 600 kp/cm².

Therefore, the glass pane, when heated, can withstand a temperature difference of about 300° C between the hotter middle of the pane and the cooler edge. The reduction of the strength of the pane caused by this stress amounts to approximately 50 kp/cm².

The windowpane is installed in a steel frame. The margin of the pane is covered by the steel frame on a width of about 20 mm. The steel window frame with glazing is set in a 12 mm thick brick wall serving as a chamber wall in a kiln. The fire chamber is heated in accordance with the Standard Temperature Curve of DIN 4102 (1970 Edition), sheet 2, Section 5.2.4 (FIG. 3, Curve I). The windowpane survives the heating process and not until after 90 minutes is it deformed to such an extent as to make the passage of fire through it possible. The furnace chamber has a temperature of approximately 990° C after the 90 minute period.

EXAMPLE 2

Two panes measuring 500 × 500 × 5 mm made of a glass of the composition (in % by weight): $SiO_2$ 65.60; $B_2O_3$ 11.50; $Al_2O_3$ 5.10; $Na_2O$ 6.70; ZnO 4.50 and BaO 6.70, and having the physical properties: $\alpha$ (20° – 300° C) = 54 . $10^{-7}$ (° $C^{-1}$); E = 7.0 . $10^5$ (kp/cm²) are pressed successively between two ceramic plates which can be heated.

Between the ceramic plates and the glass sheet in each case there is a 2 mm thick aluminum silicate fiber felt. The margin of the glass projects 5 mm beyond the ceramic plates on all sides. About the projecting edge of the glass there is laid a hollow metal frame which can be cooled both with water and with air. The glass between the ceramic plates is heated slowly to 700° C. After this temperature is reached, the margin of the glass is chilled to 200° C, while the middle is still maintained at 700° C. To chill the margin of the glass, first air and then, for a short period, water is passed through the metal frame. When the margin of the glass has reached 200° C, the two ceramic plates are removed from the middle of the glass, and the glass, now held by the steel frame, is rapidly passed into an air shower such as is conventionally used for the casehardening of sheet glass.

The mechanical strength of the pane is slightly greater than the basic strength of the untreated glass.

The glass panes are installed with a steel frame in a chamber wall in a test kiln in the same manner as described in Example 1. The glass panes are heated in accordance with the Standard Temperature Curve as in Example 1. The pane survives the heating process and not until after 60 minutes do they deform to such an extent as to allow the passage of fire.

In this Example compressive prestress is also developed in the surface layer of the middle of the pane.

EXAMPLE 3

A glass sheet measuring 500 × 500 × 7 mm, made of a glass of the same composition as described in Example 1, is suspended from clamps in a 700° C furnace and heated therein for 8 minutes. Then the sheet is rapidly brought between two air blowers and gently blasted with air in its middle portion and strongly blasted along a marginal area about 2 cm wide. After cooling, a compressive stress is visible in polarized light in a marginal area approximately 2 to 3 cm wide. The fire test performed as in Example 1 gave the same results as described in Example 1.

Here, as in Example 2, compressive prestress is developed in the surface layer of the pane.

EXAMPLE 4

A glass ceramic sheet measuring 500 × 500 × 5 mm, made of glass ceramic of the composition (in % by weight): $SiO_2$ 62.00; $Al_2O_3$ 22.00; $Li_2O$ 2.80; ZnO 6.50; MgO 1.20; BaO 1.50; $TiO_2$ 1.80 and $ZrO_2$ 2.00, whose thermal expansion in the ceramized state, $\alpha$ (20° – 500° C) = 1 . $10^{-7}$ [° $C^{-1}$] and whose modulus of elasticity is 9.4 . $10^5$ [kp/cm²], was prepared by the method described in German Patent No. 1,596,863. The glass ceramic sheet is installed in a test kiln as in Example 1 and tested on the basis of the Standard Temperature Curve (STC). The glass ceramic sheet withstands a test of more than 120 minutes without disintegrating or deforming.

What is claimed is:

1. Fireproof glass in a form suitable for use as a windowpane, which will withstand heating in accordance with DIN 4102, 1970 Edition, Section 5.2.4, standard temperature Curve I as shown in FIG. 3 of the drawings, for at least 30 minutes, having a compressive prestress in the peripheral portion thereof, the product of the thermal expansion coefficient, $\alpha$ (20°–300° C), and the modulus of Elasticity, E, of the glass, being 1 to 5 kp × $cm^{-2}$ × ° $C^{-1}$.

2. Glass according to claim 1, which will withstand heating in accordance with DIN 4102, 1970 Edition Section 5.2.4, Standard Temperature Curve I, for at least 60 minutes.

3. Glass according to claim 1, having compressive prestress in the surface layer of the glass within said peripheral portion.

4. Glass according to claim 2, having compressive prestress in the surface layer of the glass within said peripheral portion.

5. Glass according to claim 1, which is a borosilicate glass having a thermal expansion coefficient, $\alpha$, for 20°–300° C, in the range of 30 × $10^{-7}$ to 65 × $10^{-7}$ per ° C.

6. Glass according to claim 1, which is a alumo-borosilicate glass having a thermal expansion coefficient $\alpha$, for 20°–300° C, in the range of 20 × $10^{-7}$ to 63 × $10^{-7}$ per ° C.

7. Glass according to claim 1, and withstanding a temperature gradient between the center thereof and the periphery thereof, of at least 200° C, upon heating of the glass in accordance with said standard temperature curve for 30 minutes.

8. Glass according to claim 1, having straight sides joined by rounded corners.

9. Glass according to claim 1, the glass being round.

10. Glass according to claim 1, the glass being free of corners formed by intersecting straight sides.

11. Glass according to claim 1, which is dome shaped.

12. Glass according to claim 1, and a frame in which the glass is mounted.

13. Glass according to claim 1, wherein glass within the peripheral area is under tensile stress.

14. Glass according to claim 13, wherein said tensile stress is 80–100 kp/cm².

15. Glass according to claim 5, having the following compositions:

| | | | |
|---|---|---|---|
| $SiO_2$ | 64 – 81 | weight % | |
| $B_2O_3$ | 6 – 17 | " | |
| $Al_2O_3$ | 1.5 – 7 | " | |
| $P_2O_5$ | 0 – 3 | " | |
| $Li_2O$ | 0 – 0.5 | " | |
| $Na_2O$ | 3 – 10 | " | |
| $K_2O$ | 0 – 6 | " | |
| CaO | 0 – 5 | " | |
| ZnO | 0 – 5 | " | |
| MgO | 0 – 1 | " | |
| BaO | 0 – 8 | " | |

16. Glass according to claim 6, having the following composition:

| | | | |
|---|---|---|---|
| $SiO_2$ | 52 – 70 | weight % | |
| $B_2O_3$ | 1 – 14 | " | |
| $P_2O_5$ | 0 – 8 | " | |
| $Al_2O_3$ | 9 – 22 | " | |
| $Na_2O$ | 0 – 9 | " | |
| CaO | 0 – 8 | " | |
| MgO | 0 – 8 | " | |

| | -continued | |
|---|---|---|
| BaO | 0 – 5 | '' |
| ZnO | 0 – 7 | '' |
| CuO | 0 – 4.5 | '' |
| MnO | 0 – 3 | '' |

17. Glass according to claim 2, wherein the glass within the peripheral area is under tensile stress.

18. Glass according to claim 5, wherein the glass within the peripheral area is under tensile stress.

19. Glass according to claim 6, wherein the glass within the peripheral area is under tensile stress.

20. Glass according to claim 3, wherein the glass within said peripheral area and surface layer is under tensional stress.

21. Glass according to claim 4, wherein the glass within said peripheral area and surface layer is under tensional stress.

* * * * *